Aug. 20, 1940.　　　　R. H. WHITELEY　　　2,212,218
LUBRICATION DEVICE
Filed Jan. 3, 1938　　　　4 Sheets-Sheet 1

Inventor
Robert H. Whiteley
By Williams, Bradbury, McCaleb & Hinkle
Attys.

Aug. 20, 1940.   R. H. WHITELEY   2,212,218
LUBRICATION DEVICE
Filed Jan. 3, 1938   4 Sheets-Sheet 2
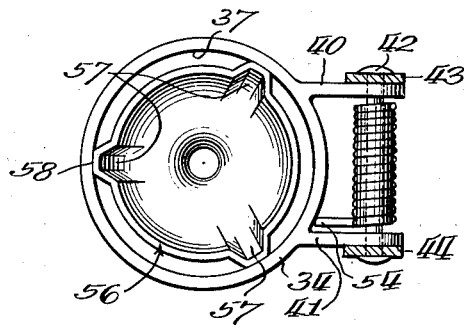
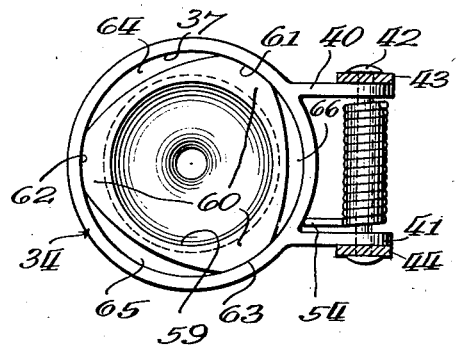
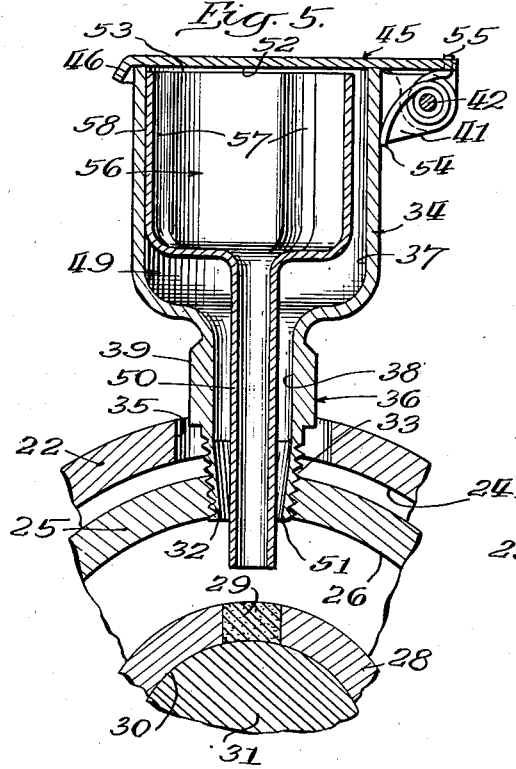
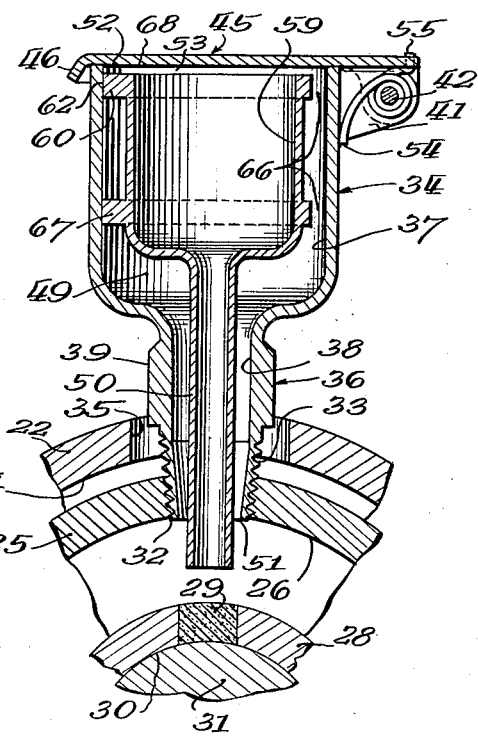
Inventor.
Robert H. Whiteley
By Williams, Bradbury, McCalet & Hinkle
Attys.

Aug. 20, 1940.　　　　R. H. WHITELEY　　　　2,212,218
LUBRICATION DEVICE
Filed Jan. 3, 1938　　　　4 Sheets-Sheet 3

Inventor:
Robert H. Whiteley
By Williams, Bradbury, McCall & Hinkle
Attys.

Aug. 20, 1940.    R. H. WHITELEY    2,212,218
LUBRICATION DEVICE
Filed Jan. 3, 1938    4 Sheets-Sheet 4
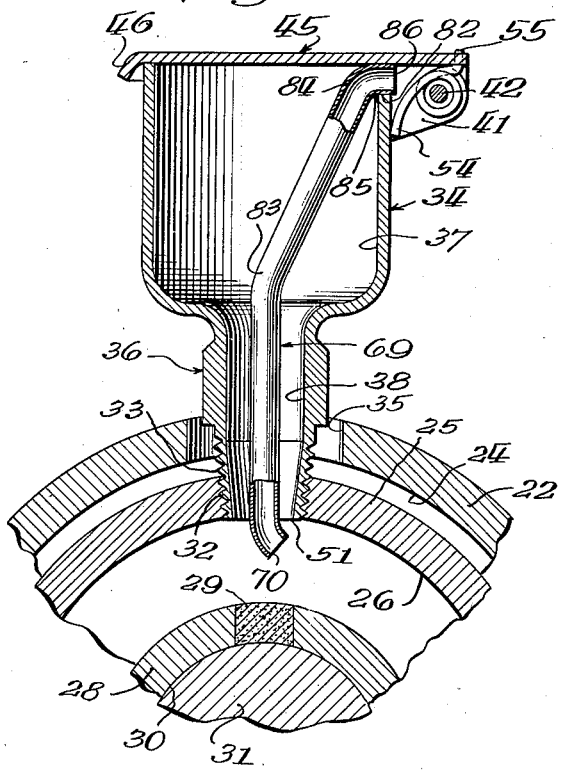
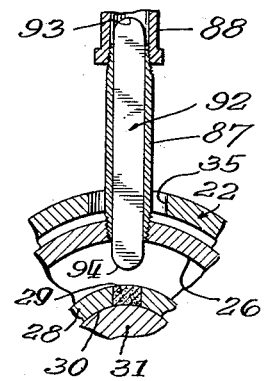
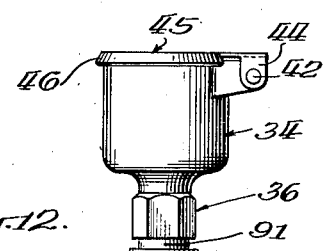
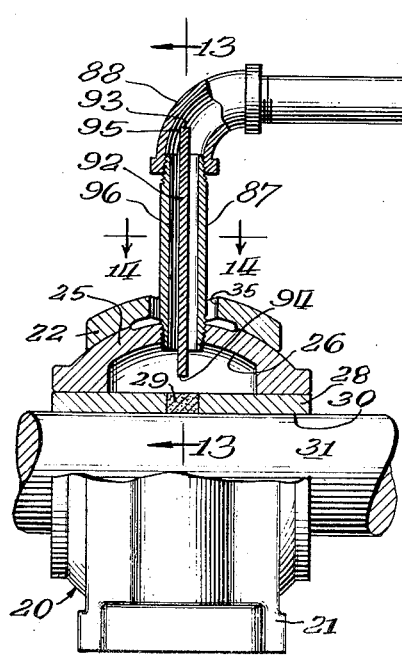
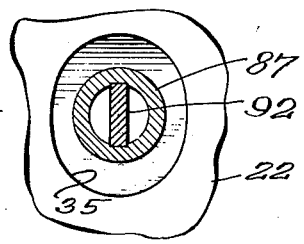
Inventor
Robert H. Whiteley
By Williams, Bradbury, McCaleb & Hinkle
Attys.

Patented Aug. 20, 1940

2,212,218

UNITED STATES PATENT OFFICE 2,212,218

LUBRICATION DEVICE

Robert H. Whiteley, Oak Park, Ill., assignor to Randall Graphite Products Corporation, Chicago, Ill., a corporation of Delaware Application January 3, 1938, Serial No. 183,021

6 Claims. (Cl. 184—65)

The present invention relates to lubrication devices, and is particularly concerned with lubrication devices for supplying bearings with relatively thick lubricant or for supplying the reservoir of a reservoir type self-lubricating bearing with lubricant of this kind.

The present devices are of particular importance when used in connection with self-lubricating bearings of the reservoir type, exemplified in my prior Patent No. 2,048,763, but the invention is also of importance in connection with the supply of lubricant to any bearing where the lubricant is relatively thick and where air binding is experienced.

Considerable difficulty has been experienced in the replenishing of lubricant in reservoirs of the self-lubricating bearings of the type disclosed in my prior patent, mentioned above, and this difficulty has been ascribed to air binding.

Even when the oil cups of the prior art, which are used for this purpose, are secured directly into the reservoir, the lubricant does not descend into the reservoir as desired, with the devices of the prior art, and the same result is experienced when oil pipe lines are used with an oil cup on the end of the oil pipe for filling such reservoirs.

In order to determine the cause of this condition, I have made investigation, and have found that there is a point of maximum air pressure at the lower end of the cup, and after investigation and experimentation I have developed a number of lubrication devices in the form of oil cups, with which such reservoirs may be very quickly filled with relatively thick lubricant. The lubricant used is frequently a semi-solid lubricant, such as petroleum jelly, which melts at a predetermined temperature, in order that the self-lubricating bearing may be provided with a supply of lubricant as soon as the bearing rises in temperature.

This semi-solid lubricant presents the greatest difficulty in the refilling or replenishing of the reservoirs of my bearings, and it is of the utmost importance that the refilling devices be so arranged that adequate lubrication is insured.

Unless the lubricant which is placed in the oil cup actually reaches the reservoir and comes in contact with the porous carbon plugs which conduct lubricant from the reservoir to the bearing surface, bearing failures may be experienced.

It should be understood that the invention is of importance in connection with any kind of lubricant, whether it be thin, thick, semi-solid, viscous or otherwise as air binding may be experienced with any kind of lubricant.

When a bearing of this type is provided with an oil cup and the operator has filled the oil cup, it would naturally be assumed that the bearing is provided with lubricant, and therefore air binding in the oil cup or reservoir must be positively avoided; otherwise the operator will think that his bearing has adequate lubrication, when, in fact, it has not.

One of the objects of the invention is the provision of improved methods of filling closed reservoirs for self-lubricating bearings, by means of which the operator may be assured that the lubricant reaches the bearing.

Another object is the provision of an improved form of filling device or oil cup for reservoirs or for lubrication of bearings without reservoirs, by means of which air binding in the conduits for lubricant is eliminated.

Another object is the provision of lubrication devices in the form of oil cups which are adapted to receive especially heavy or semi-solid lubricant and which are adapted to conduct the lubricant by gravity to the desired points without possibility of entrapped air in the conduits preventing the flow of lubricant to its proper place.

Another object of the invention is the provision of improved lubrication devices of the class described which are efficient, sturdy, capable of economical manufacture, and which, in fact, may be manufactured by the addition of certain novel parts to the oil cups of the prior art.

Other objects and advantages of the invention will be apparent from the following description and the accompanying drawings, in which similar characters of reference indicate similar parts throughout the several views.

Referring to the drawings, of which there are four sheets:

Fig. 4 is a top plan view of a modification taken at a point just below the cover, to show the construction of the oil cup.

Fig. 5 is a view similar to Fig. 2 of the modification of Fig. 4.

Fig. 6 is a similar view of another modification.

Fig. 7 is a vertical sectional view similar to Fig. 2 of the modification of Fig. 6.

Fig. 11 is a view similar to Fig. 9 of another modification, in which the air vent emerges at the side of the oil cup.

Fig. 12 is a vertical sectional view of a bearing connected with an oil cup and an oil conduit, in which air binding might be experienced, except for the provision of the improved features which are shown in section in Fig. 12, along a plane passing through the axis of the bearing and the axis of the upwardly extending oil pipe.

Fig. 13 is a fragmentary sectional view, taken on the plane of the line 13—13 of Fig. 12, looking in the direction of the arrows.

Fig. 14 is a horizontal sectional view, taken on the plane of the line 14—14 of Fig. 12.

Figure 1:
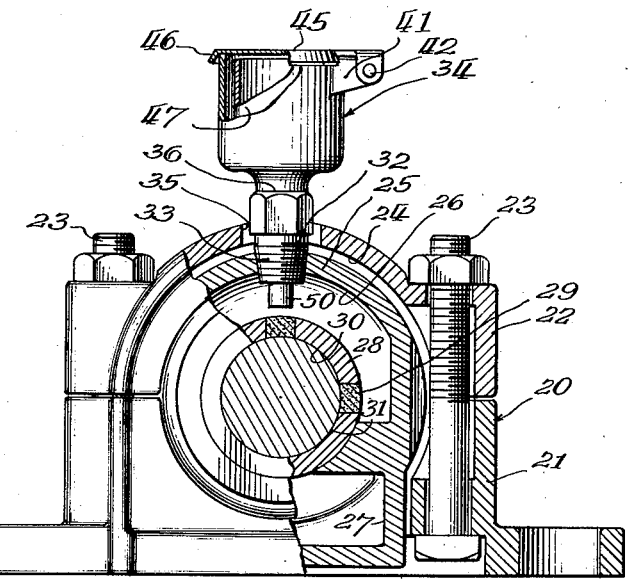
Fig. 1 is a vertical elevational view in partial section, showing a self-lubricating bearing equipped with an oil cup or lubrication device, constructed according to the invention, and capable of carrying out the present methods.

Referring to Fig. 1, 20 indicates in its entirety a self-lubricating bearing of the pillow block type, which is described in my prior patent, mentioned above, and which comprises a base member 21, an upper half 22 secured thereto by a pair of screw bolts 23.

The two halves 21, 22 are provided with a partially spherical socket 24, which receives the ball 25 that forms the outer part of a reservoir 26.

A reserve reservoir 27 at the bottom holds a reserve supply of lubricant, and the bearing is indicated by the numeral 28, being provided with a multiplicity of porous carbon plugs 29, which conduct lubricant from the reservoir 26 to the bearing surface 30, which is in contact with the shaft 31.

The reservoir 26 is filled through a bore 32, which has ordinary pipe thread and is adapted to receive the threaded end 33 of an oil cup, which is indicated in its entirety by the numeral 34.

The upper half of the housing 22 has an enlarged aperture 35 about the pipe 36 of the oil cup 34 so as to permit a limited universal movement of the ball 25 within the two halves 21, 22 of the pillow block.

Figure 2:
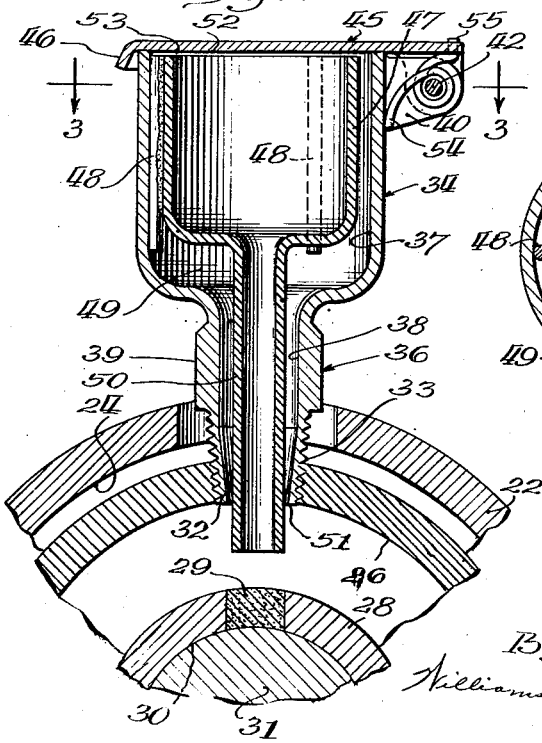
Fig. 2 is a fragmentary vertical sectional view, taken on a plane passing through the axis of the oil cup conduit and at right angles to the bearing.
Figure 3:
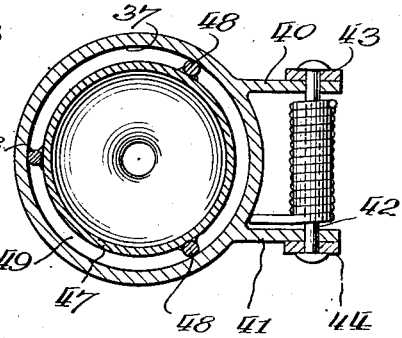
Fig. 3 is a horizontal sectional view through the oil cup, taken on the plane of the line 3—3 of Fig. 2.

Referring to Figs. 2 and 3, these views show in greater detail the improved features of the oil cup which is used in the combination with the bearing 20 of Fig. 1, according to the present invention.

The oil cup 34 comprises a substantially cylindrical body, having a cylindrical inner chamber 37 which communicates with an outlet bore 38 in the pipe 36. The pipe 36 has the lower threaded portion 33 and the non-circular or hexagonal portion 39, to which the wrench may be applied.

At one side of the cylindrical cup 34 there are a pair of laterally projecting parallel bearing lugs 40, 41, which have apertures for receiving the hinge pin 42 which also passes through the bearing lugs 43, 44 of the cover 45.

The cover 45 is of sufficient size to close the upper end of the oil cup, and may have a downwardly extending flange 46, which embraces the outer and upper edge of the oil cup, but preferably having a clearance therewith.

In order to prevent air binding at the lower part of the oil cup or conduit 38, the present oil cups are provided with an inner housing 47, which may be of cylindrical shape and is of a smaller size than the size of the chamber 37. The clearance between the housing 47 and the wall of the oil cup 34 is such that a plurality of wires or spaces 48 have a drive fit in the annular space which is defined between the wall of the oil cup 34 and the inner housing 47. The wires 48 may be soldered to the inner wall 47. The inner housing 47, which is adapted to receive the oil or semi-solid lubricant, is shorter than the oil cup 34, so that there is a conduit at 49 between the lower walls of the oil cup and housing 47 and the housing 47 is provided with a downwardly extending metal tube 50, which extends into the conduit 38 but is spaced from the wall thereof.

Housing 50 preferably extends down into the reservoir 26 beyond the end 51 of the oil cup, and there is an annular conduit between the tube 50 and the inner wall of the pipe 36.

The housing 47 is so secured in the oil cup that it projects slightly below the edge of the oil cup, the upper edge of the oil cup being indicated by the line 52, so that the cover 45 engages the upper edge of the housing 34, but has a clearance at 53 between the cover and the edge of the oil cup wall 47.

The cover is preferably provided with a helical spring which is coiled about the pivot pin 42 and has one end 54 engaging the oil cup wall and the other end 55 engaging in a slot in the cover, urging the cover into closed position with respect to the housing 47.

The housing 47 actually serves as a receptacle for the lubricant, but the annular space between the housing 47 and outer wall of oil cup 34 serves as a conduit for air, so that the entrapped air in the reservoir or in the pipe 36 or in the lower part of the oil cup is released and may pass freely from points below the oil supply in cup 47, to space above the oil. I find that with such a structure the tendency toward air binding is wholly eliminated and the reservoir 26 receives by gravity the oil which is placed in the cup member 47, so that there is no danger of lack of lubrication due to air binding.

Referring to Fig. 4, this is another modification in which the construction of the oil cup 34 may be exactly as described, but the inner housing member, which takes the place of the housing 47 of Fig. 2, is of slightly different shape. In this case the inner housing, which is indicated by the numeral 56, is of substantially cylindrical shape, but it is provided with a plurality, and preferably at least three, outwardly pressed ribs 57, which span the annular space between the wall of the inner housing 56 and the outer wall 34. The ribs 57 preferably have outer partially cylindrical surfaces 58 so that the inner housing 56 fits with a drive fit in the oil cup 34 in the position shown in Fig. 5. In this case it is unnecessary to use the spacing wires 48, as the oil receiving member or housing 56 is itself provided with the pressed spacing ribs. The friction between the surfaces 58 and the inner wall is sufficient so that the oil receptacle 56 is held in the position of Fig. 5 and does not drop down into the oil cup.

Referring to Figs. 6 and 7, this is another modification, in which the oil receiving cup is designated by the numeral 59, and in this case it is provided with a plurality of radially extending flanges 60.

While the oil receiving cup or housing 59 is of cylindrical shape, the flanges 60 are provided with outer cylindrical edges only at the points 61, 62, and 63, and the flange 60 may be made approximately triangular so that there is a clearance or air vent space at 64, 65, 66. By means of two of such flanges 60 and 67, one adjacent the top and the other adjacent the bottom of the cup member 59, the flanges having a close frictional engagement with the interior wall of the oil cup 34, the member 59 is held in the position of Fig. 7.

In this embodiment the upper end of the inner cup member is again located below the surface of the cover 45, which vents the air from points below the oil to the space above the oil.

It will thus be observed that by means of an inner housing member the present invention may be applied to existing oil cups, and, as a matter of fact, the inner housing becomes the cup which receives the oil, while the member which is used as an oil cup in the devices of the prior art becomes an outer housing.

Figure 8:
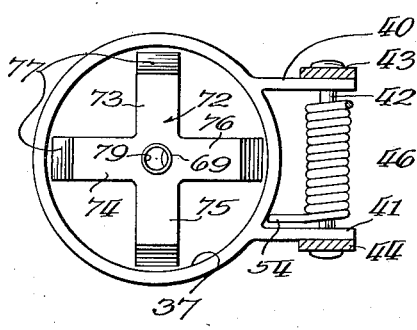
Fig. 8 is a top plan view with part of the cover in section, at a point just below the cover of the oil cup, showing another modification.

Referring to Fig. 8, this is a modification in which the oil cup 34 is of the same construction as shown in Fig. 7. This modification, however, includes a different type of air venting arrangement in the form of a metal tube 69, which extends from a point 70 below the end 51 of the conventional oil cup to a point 71 slightly spaced from the cover 45.

The lower end 70 of this tube 69 is preferably laterally bent, which tends to cause any lubricant which might run over it from closing the end of the tube. The tube 69 is supported by a plurality of spring arms in the form of a spider member 72, having a plurality of radially extending arms 73—76. Each of these arms may be provided with a downwardly turned flange member 77 that engages the wall of the oil cup 34 at one of the points 78. The spider 72 may have a centrally located aperture 79 for passing the tube 69 which is secured in place by solder 80 or other convenient fastening means.

Figure 10:
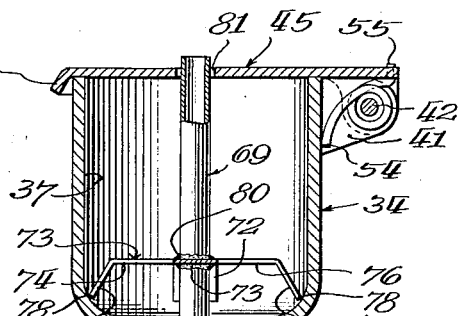
Fig. 10 is a view similar to Fig. 9 of another modification, which is similar to that of Fig. 9, except that the air vent emerges from a hole in the cover.
Figure 9:
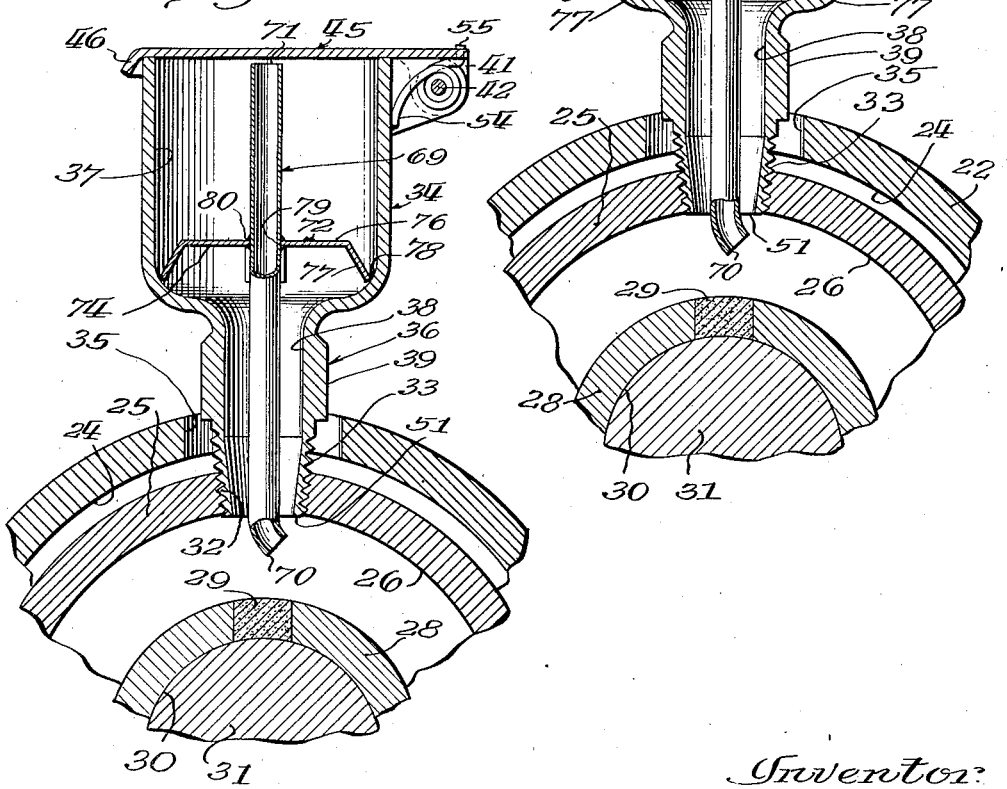
Fig. 9 is a vertical sectional view, taken on the axis of the oil cup, showing details of construction of the modification of Fig. 8.

In the modification shown in Fig. 10, the structure is similar to that of Fig. 9 except that the tube 69 is longer and extends to a point above the cover 45. The cover 45 is provided with an aperture 81, which is enlarged to permit the pivotal movement of the cover on or off the end of the pipe 69.

In both the modifications of Figs. 10 and 9, care must be taken to keep the upper end of the tube 69 free of lubricant, the lubricant being placed in the oil cup 34 between the tube 69 and the outer wall thereof.

The operation of this embodiment is the same as those previously described, except that the air is vented through the pipe 69 at the middle of the lubricant, rather than the annular space between the inner and outer cups of Figs. 1–7.

Referring to Fig. 11, this is another modification in which the oil cup 34 may be of the same structure except that it is provided with a groove 82 at the top of one side, preferably adjacent the pintle 42. The tube 69 in this case is laterally bent at 83 and extends diagonally upward from the middle of the pipe or conduit 38 to the point 84, where the pipe is again bent in a horizontal direction to fit into the groove 82. It is secured in the groove 82 with its lower end centered in the conduit 38 by means of the solder 85, or other convenient fastening means. The end 86 of the tube in this case is the point where the air is discharged, and this location for the air discharge conduit is advantageous because there is little danger of it being clogged with solid lubricant in the filling of the cup 34, as it is directed away from the front edge of the cup and protected by the cover 45.

Referring to Figs. 12–14, this is a modification in which the oil cup 34 is connected to the reservoir 26 by means of a plurality of pipes, such as the vertically extending metal pipe 87, the elbow 88, horizontal pipe 89, elbow 90, and vertical pipe or conduit 91. Any of the air venting arrangements disclosed in Figs. 1–11 may be employed within the cup 34 of Fig. 12, but an additional arrangement is desirable to prevent air binding at the pipe 87. This takes the form of a strip of metal 92, which is of sufficient width, as shown in Fig. 13, to span the inner diameter of the pipe 87, in which it is secured by a frictional fit.

The metal strip 92 extends from the point 93 well up in the elbow 88 to the point 94, down in the reservoir 26. Both ends may be semi-circular, and the end 93 is spaced from the inner left surface of the elbow 88 in order to provide an air conduit. The lubricant which is conducted into the elbow 90 and pipe 89 from the cup 34 runs along the lower pipe 89 into the elbow 88 and is impelled by the pressure of lubricant above it in the cup 34. Neither the pipe 89 nor elbow 88 becomes so full that lubricant reaches the clearance space 95 on the left side of the dividing strip 92 in Fig. 12, and thus that space or conduit 96 is maintained open for the venting of air from the reservoir 26 or from any elevation in the pipe 87.

The air passes from the conduit 96 through the clearance 95 into the upper half of the pipe 89, and thence over to the clearance conduit in the cup 34, which conduit extends down into the elbow 90. I have found that by means of these arrangements, solid or semi-solid lubricant of the type which I prefer to use in my self-lubricating bearings can be placed in the oil-receiving chamber of these oil cups, and there is a certainty that it will gravitate to the reservoir of the bearing. The air binding which occurred with the devices of the prior art, comprising ordinary oil cups without these arrangements, is wholly eliminated, and the lubrication of the bearing is assured when lubricant is properly placed in the oil cup. The danger of lack of lubrication which was caused by air binding of the devices of the prior art is wholly eliminated, and all of the difficulties of replenishing the oil in the reservoirs of my bearings are solved by these constructions.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An oil cup comprising an outer cup member communicating with a supporting conduit, and an inner cup member, said inner cup member being adapted to receive the lubricant, and having an oil discharge conduit located in said supporting conduit, said members and conduits being so arranged that there is an air vent conduit between them, said oil cup having a plurality of spacing members of narrow width in between said cup members and having a frictional engagement with said cup members to hold the inner cup member and conduit in spaced relation to the outer cup member and supporting conduit.

2. An oil cup comprising an outer cup member communicating with a supporting conduit, and an inner cup member, said inner cup member adapted to receive the lubricant, and having an oil discharge conduit located in said supporting conduit, said members and conduits being so arranged that there is an air vent conduit between them, said inner cup member being provided with a plurality of outwardly pressed ribs for engaging the inner wall of said oil cup to form an air discharge conduit between the inner and outer cups.

3. An oil cup comprising an outer cup member communicating with a supporting conduit, and an inner cup member, said inner cup member adapted to receive the lubricant, and having an oil discharge conduit located in said supporting conduit, said members and conduits being so arranged that there is an air vent conduit between them, said oil-receiving cup being provided with laterally extending lugs for engaging the wall of the oil cup at spaced points to provide an air discharge conduit between said cup members.

4. In an oil cup installation, a lubricant container comprising a sheet metal member of substantially cylindrical shape, having a plurality of outwardly extending ribs projecting beyond the outer cylindrical part of said container and adapted to engage the walls of a standard oil cup having a discharge aperture, said container having a depending conduit adapted to extend through and beyond the end of the discharge aperture of said oil cup.

5. In an oil cup, the combination of a reservoir provided with a connection for connection to a bearing to be lubricated, said connection having a conduit extending therethrough, and an inner lubricant-receiving housing, said inner housing being provided with means for spacing it from the walls of said cup to form a conduit between said oil cup and said inner housing, said inner housing having a depending tubular conduit adapted to be spaced from the walls of the conduit in said connection and to extend beyond the end of said connection, whereby an air vent is provided outside of said inner container for preventing air binding, said spacing means comprising integral ribs formed on said inner container and engaging the walls of said oil cup.

6. In an oil cup, the combination of a reservoir provided with a connection for connection to a bearing to be lubricated, said connection having a conduit extending therethrough, and an inner lubricant-receiving housing, said inner housing being provided with means for spacing it from the walls of said cup to form a conduit between said oil cup and said inner housing, said inner housing having a depending tubular conduit adapted to be spaced from the walls of the conduit in said connection and to extend beyond the end of said connection, whereby an air vent is provided outside of said inner container for preventing air binding, said spacing means comprising a pair of radially extending flanges engaging the walls of said oil cup at spaced points.

ROBERT H. WHITELEY.